Aug. 28, 1962
D. R. REXFORD
3,051,677
COPOLYMER ELASTOMER OF VINYLIDENEFLUORIDE
AND HEXAFLUOROPROPENE
Filed April 29, 1957
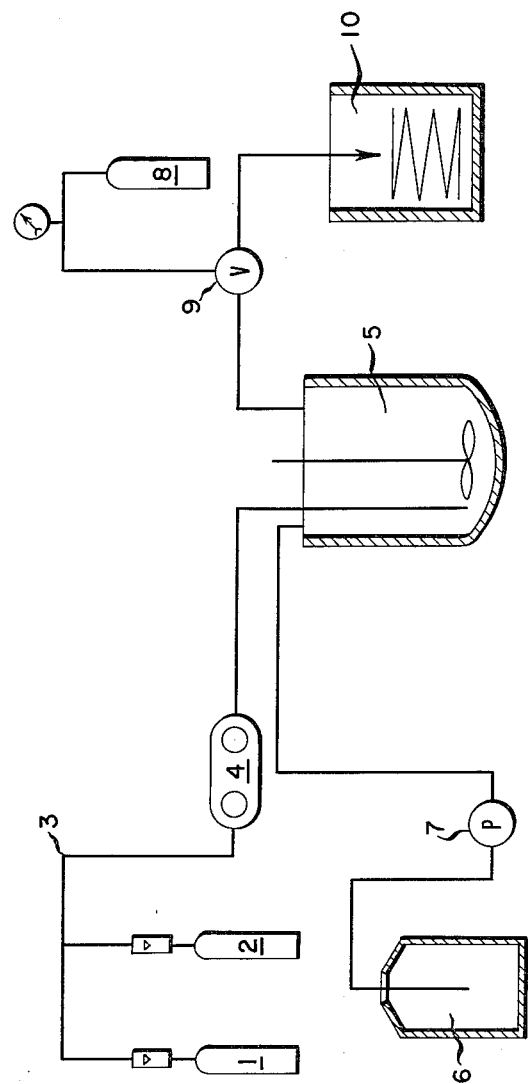
INVENTOR
DEAN R. REXFORD
BY *Cullen H. Frey*
ATTORNEY

United States Patent Office 3,051,677
Patented Aug. 28, 1962

3,051,677
COPOLYMER ELASTOMER OF VINYLIDENE-
FLUORIDE AND HEXAFLUOROPROPENE
Dean R. Rexford, Wilmington, Del., assignor to E. I. du Pont de Nemours and Company, Wilmington, Del., a corporation of Delaware
Filed Apr. 29, 1957, Ser. No. 655,856
11 Claims. (Cl. 260—29.6)

This invention relates to new chemical compounds, and more particularly to elastomeric copolymers of vinylidene fluoride and hexafluoropropene, and a preferred process for preparing the same.

This application is a continuation-in-part of my copending application Serial No. 576,519, filed April 6, 1956, and now abandoned, which in turn is a continuation-in-part of my application Serial No. 504,351, filed April 27, 1955 and now abandoned.

It is known that "Teflon" polytetrafluoroethylene, which is a polymer of tetrafluoroethylene, shows good stability and exceptional resistance to attack by chemical agents. This product, however, is not considered as an elastomer, since it does not have characteristic elastomeric properties. Other fluorine-containing polymeric compounds, such as the copolymers of tetrafluoroethylene and hexafluoropropene, have been disclosed, but, again, these products are not considered to be elastomers, tending more to be hard, brittle resins.

More recently there has been disclosed in "Rubber Age," vol. 76 (January 1955), on pages 543–550, a new copolymer of vinylidene fluoride and chlorotrifluoroethylene which has elastomeric properties and can be compounded and cured to produce a relatively thermal stable product which has good chemical resistance. This product, however, has a thermal stability of only up to around 400° F., and even when the product is held at this temperature for any length of time it loses its tensile strength and becomes of little value.

It is an object of the present invention to produce a new and improved elastomer which has excellent thermal stability at temperatures exceeding 400° F. and which also exhibits excellent resistance to chemical attack. It is a further object of the invention to provide an elastomer which has good thermal stability and shows good resistance to chemical attack which can be worked on conventional rubber equipment and which can be readily and economically manufactured. It is a still further object of the invention to provide a process for preparing homogeneous copolymers of vinylidene fluoride and hexafluoropropene having highly desirable properties.

The copolymers of the present invention are prepared by a process which results in elastomeric compositions containing from 70% to 30% by weight of vinylidene fluoride units and from 30% to 70% by weight of hexafluoropropene units. When the copolymer contains less than 30% of hexafluoropropene units it tends to become non-elastic. When the polymerization of the two monomers is carried out by the batch process, an excess of the hexafluoropropene is employed over that present in the resulting polymer, so that ordinarily in the batch process from 60 to 15 parts by weight of vinylidene fluoride will be copolymerized with from 40 to 85 parts by weight of hexafluoropropene to give products containing from 30% to 70% copolymerized hexafluoropropene. Since hexafluoropropene does not homopolymerize under the conditions described herein, the use of amounts of hexafluoropropene in excess of 85% by weight in a batch process does not produce copolymers containing more than 70% by weight of copolymerized hexafluoropropene. In the continuous process, the copolymerization will be carried out employing substantially the same amounts of the monomers desired in the final copolymer.

The polymerization is preferably carried out at temperatures of about 80° C. to 120° C., where the reaction is rapid. At temperatures below 80° C. a very low rate of conversion results. The process may be carried out at temperatures above 120° C., but at such temperatures the process is less economical.

The polymerization is preferably carried out in a stainless steel pressure reactor or other type of equipment which will not be reacted upon during the process, such as an enamel-lined pressure vessel, etc. In the batch process the vessel is flushed free from oxygen with a gas such as nitrogen, then it is charged with deoxygenated water and the polymerization initiator. After closing and evacuating the vessel, it is then charged with the gaseous reactants and heated to a reaction temperature of from 80° to 120° C. under agitation. When the reaction is completed, the mass is cooled to room temperature and any unreacted gas removed. The partially coagulated copolymer is then completely coagulated with acids or salts in the customary manner, and is discharged from the reactor.

The copolymers of the present invention are preferably prepared by a continuous process wherein the monomers are continuously fed into the reaction vessel in the proportion desired in the ultimate copolymer, the reaction being carried out under constant conditions such as pressure, temperature, rate of conversion, and constant ratio of catalyst to total monomers fed. In the accompanying drawing which forms a part of the present specification, a schematic representation of how the continuous process may be carried out is given.

As illustrated in the drawing, hexafluoropropene is metered from cylinder 1 and vinylidene fluoride is metered from cylinder 2 into line 3, and the mixture passes into compressor 4 where it is pumped into reaction vessel 5. Simultaneously, a solution of the polymerization initiator and dispersant in tank 6 is pumped by pump 7 into reaction vessel 5. The reaction vessel 5 is preferably filled completely with liquid. Cylinder 8 contains nitrogen or other inert gas and this gas applies pressure to a pressure control valve 9. When the internal pressure in reaction vessel 5 exceeds the applied pressure on valve 9, valve 9 functions to permit the copolymer emulsion to escape from the reaction vessel into receiver 10 from which the latex is removed and coagulated for further processing.

In carrying out the process, it is necessary to have present a polymerization initiator. A well known class of polymerization initiators which may be used are those containing the peroxy linkage, as for example, the acyl peroxides, e.g. dibenzoyl peroxide, benzoylacetyl peroxide, diacetyl peroxide; the dialkyl peroxides, as for example diethyl peroxide and ditertiary butyl peroxide; hydrogen peroxide; salts of true non-metallic peracids as, for example, ammonium persulfate,, potassium persulfate and sodium persulfate. The preferred initiator is a salt of a peracid; ammonium persulfate being most preferred because of its low cost. The preferred amount of initiator used is normally not less than about 0.001% but generally not more than about 5% based on the total weight of the monomers. Preferably a quantity of initiator between 0.001% and 2% is preferred. Catalyst activators such as sodium bisulfite and buffers such as sodium phosphate may also be used in the polymerization system.

If it is desired to obtain the elastomer in the form of a latex, a dispersant may be incorporated into the aqueous solution to form a homogeneous latex of the polymer, which can be readily pumped from the vessel for further processing. The dispersant should preferably be a salt of a fluoro acid such as the ammonium salt of omega-hydroperfluoroheptanoic acid or ammonium perfluorooctanoate, or other types of dispersing agents which do not readily react with fluorine-containing compounds such as "Chlorendic Acid," a hexachloroendomethylenetetrahydrophthalic acid. Usually it is desired to use a small amount of the ammonium salt of the fluoro acid even when other dispersing agents are employed. The dispersing agents should be employed in from about 0.01% to about 0.2% of the weight of the water used in the reaction. After coagulating, filtering and washing with water, the product is dried and is ready for subsequent compounding and curing.

In the batch process a conversion of up to about 90% of the monomers to the copolymer is obtained. When the reaction is carried out batch-wise with a gaseous reactant mixture comprising about 60% by weight vinylidene fluoride and about 40% by weight hexafluoropropene, the elastomeric copolymer will contain approximately 70% by weight of vinylidene fluoride and 30% by weight of hexafluoropropene. On the other hand, when the gaseous reactant mixture is approximately 85% of hexafluoropropene and 15% of vinylidene fluoride, then the elastomeric copolymer obtained will contain about 70% by weight of hexafluoropropene units and about 30% by weight of vinylidene fluoride units. It is of course to be understood that copolymers having intermediate amounts of the reactant units can be obtained by the batch process by varying the ratios of gaseous reactants within the range indicated above.

In the continuous process, it is necessary to control the following features:

A. MONOMER FEED

The hexafluoropropene and vinylidene fluoride must be fed into the reactor so that the composition of their mixture is a value ranging from 30 to 70 weight percent of hexafluoropropene monomer and 70 to 30 weight percent of vinylidene fluoride monomer. In addition to this concentration range, it is necessary to maintain a constant ratio of the monomers to each other at the concentration chosen. That is, having once selected a mixture of monomers, for example, 40% hexafluoropropene and 60% vinylidene fluoride, that mixture must be maintained in that ratio to obtain a polymer with consistent properties. If the ratio is changed during the continuous process, the product polymer will have physical properties somewhat different from those obtained when a different ratio is used.

B. THE TEMPERATURE AND PRESSURE

The pressure at which the reaction is carried out will normally be selected from about 250 to 1500 p.s.i.g. and the temperature of the reaction will be from about 80° C. to 120° C. Temperatures and pressures below these ranges are impractical because of extremely low rate of polymerization. Higher temperatures and pressures are considered economically undesirable.

C. CONSTANT CONVERSION REQUIREMENTS

In the process of this invention it is necessary to maintain the polymerization so that the monomers will be converted to products at a constant conversion. If this constant conversion is not maintained, the polymer obtained will vary in properties. This constant conversion is easily obtained by maintaining the polymerization system at equilibrium during the process. Usually equilibrium conditions are obtained in conventional plant equipment in a short period of time.

D. CATALYST CONCENTRATION

The amount of the polymerization initiator will normally be between 0.001% and 2% on the weight of the monomers, and when a concentration is chosen that concentration must be maintained constant during the operation of the process. Unless this is done, the elastomeric product will not have uniform properties due to variations in molecular weight. Expressed another way, the polymer will be heterogeneous in contrast to the homogeneous polymer that is desired. It is essential that the ratio of catalyst to the total monomers in the feed be kept constant; i.e., after a catalyst concentration within the above limits is selected and a selection of monomer ratio to each other is made, these ratios must remain constant or again the homogeneity of the polymer will be affected and the physical properties of the copolymer will be impaired.

It is preferred to carry out the process with the reactor entirely filled with the emulsion, since varying levels (or volumes) of liquid in the reactor will cause the end product to vary. By using a constant level reactor, however, constant conditions are readily maintained which aid in yielding a copolymer of uniform properties. A dispersant is used to ensure a uniform emulsion in the reaction vessel.

The elastomeric copolymers obtained from the reaction of this invention are elastomeric in nature, but can be further treated to produce elastomers of exceptionally good physical and chemical properties. This subsequent treatment is a curing process which probably causes cross-links to be established throughout the copolymer. Curing and compounding of polymers is well known in the art and can conventionally be carried out by the usual methods for this type of polymer. Particularly useful in curing the copolymers of this invention are the peroxides, specifically benzoyl peroxide, or polyamines such as triethylene tetramine, hexamethylene diamine, hexamethylene tetramine, hexamethylenediaminecarbamate, 1,3-diaminocyclohexane, bis(4-aminocyclohexyl)methane, and the like. Also useful is a cure obtained with ionizing irradiation, either beta or gamma rays, as obtained from high intensity cobalt-60 or by high energy electrons obtained from a Van der Graaf accelerator. When using peroxides, improved results are obtained by adding free radical acceptors such as N,N'-m-phenylene-bis-maleimide or methylene-bis-acrylamide. These materials are also useful in combination with high energy radiation. After curing either by peroxide compounding and heat treatment or by irradiation or other method, an elastomer is obtained which is insoluble in ketonic, ester, hydrocarbon and halogenated hydrocarbon solvents, which is resistant to concentrated nitric and sulfuric acids and is stable at temperatures above 400° F. A particularly satisfactory cure can be obtained by a combination of irradiation as above mentioned, followed by a heat treatment as more particularly exemplified hereinafter.

The elastomeric copolymer of this invention can be used in the manufacture of films, foils, tapes, fibers and articles of any desired shape, and can be used as coatings for wires, fabrics, ceramics, etc., and for the impregnation of felt which may be made from various fibers since the products can be extruded and molded under pressure. Ordinarily these copolymers are preferably extruded at temperatures not substantially higher than 190° F., although this temperature will vary depending upon the particular constitution of the copolymer.

The following examples are given to illustrate the preferred methods of carrying out the preparation of these new copolymers. The parts used, unless otherwise designated, are by weight.

*Example 1*

A conditioned stainless steel pressure vessel is swept with nitrogen and charged with 125 parts of deoxygenated distilled water containing 0.16 part of ammonium persulfate, 0.03 part of sodium bisulfite and 0.33 part of disodium phosphate heptahydrate. The closed vessel is cooled to —80° C. and purged of oxygen by three alternate cycles of producing a vacuum in the vessel and then pressuring with oxygen-free nitrogen. The nitrogen is then removed, and, while the system is under reduced pressure, 35 parts each of gaseous hexafluoropropene and vinylidene fluoride is bled into the pressure vessel. The system is agitated and the temperature inside the reaction chamber raised to 100° C. over a 15 minute period. The autogenous pressure is observed to increase to about 700 p.s.i.g., which drops to 300 p.s.i.g. after two hours. After an additional heating period of 12 hours to ensure that the reaction is completed, the reaction mass is allowed to cool to room temperature and the pressure chamber vented to the atmosphere. The partially coagulated latex product is removed and coagulation completed by the addition of a small amount of dilute hydrochloric acid. The coagulated crumb is washed thoroughly with water and rolled on a hot rubber mill at about 140° C. to obtain 63 parts (90% conversion) of an off-white elastomer in rolled sheet form. Analysis of this elastomer for carbon, hydrogen and fluorine by combustion analysis indicates that the product copolymer contains about 45% hexafluoropropene and about 55% vinylidene fluoride by weight.

Example 2

Example 1 is repeated, but the pressure vessel charged with 30 parts of hexafluoropropene and 40 parts of vinylidene fluoride. The elastomer obtained is similar to, but somewhat harder than, the product of Example 1. Combustion analysis indicates that this copolymer contains about 30% hexafluoropropene and about 70% vinylidene fluoride by weight.

Example 3

When 0.01 part of the ammonium salt of omega-hydroperfluoroheptanoic acid is added to the reaction kettle charge of Example 1, the product obtained after reaction is entirely dispersed throughout the aqueous system. The product is coagulated by the addition of sodium chloride, filtered, washed and dried on a rubber mill. A product substantially identical to that of Example 1 is obtained.

Example 4

The elastomer of Example 1 is compounded at 25° C. on a rubber mill to contain the following ingredients:

|  | Parts |
|---|---|
| Copolymer | 100 |
| Benzoyl peroxide | 3 |
| Zinc oxide | 5 |
| Dibasic lead phosphite | 5 |

The compounded stock is cured by pressing in a mold for one hour at 120° to 150° C. and baked for an additional 16 hours at 100° to 150° C. The resulting vinylidene fluoride-hexafluoropropene elastomer thus obtained is extremely tough and has the following physical properties:

| Properties at 170° F. | Initial | After 72 hrs. at 400° F. |
|---|---|---|
| Tensile at break, p.s.i. | 1,710 | 1,490 |
| Elongation at break, percent | 625 | 615 |
| Modulus—300% elongation, p.s.i. | 500 | 420 |
| Hardness (Shore A) | 58 | |
| Permanent Set (ASTM D-412-51T(b)), percent | 35 | 31 |

Example 5

The copolymer of Example 1 is compounded at 25° C. on a rubber mill to contain:

|  | Parts |
|---|---|
| Copolymer | 100 |
| Benzoyl peroxide | 3 |
| Zinc oxide | 5 |
| Precipitated silica [1] | 20 |

[1] Available as "Hi-Sil" 202 from Columbia-Southern Chemical Corp.

The stock is cured at 120° C. for one hour and baked at from 120° to 150° C. for 16 hours. The vinylidene fluoride-hexafluoropropene elastomer thus obtained shows good tensile strength, as exemplified in the following table:

| Temperature of Water | 25° C. | 70° C. | 100° C. |
|---|---|---|---|
| Tensile at break, p.s.i. | 2,350 | 1,850 | 1,050 |
| Elongation at break, percent | 390 | 490 | 500 |
| Modulus—300% p.s.i. | 1,450 | 800 | 475 |

Example 6

The copolymer obtained in Example 1, subjected to the action of $10^7$ roentgens obtained as mono-energetic electrons of 2 mev. from a Van der Graaf accelerator, is converted to a tough elastomer which closely resembles the product obtained by heat curing stock compounded with benzoyl peroxide.

Example 7

The cured copolymer of Example 5 was subjected at 25° C. by immersion to the action of n-hexane, carbon tetrachloride, cyclohexane, carbon disulfide and formic acid. Little or no swelling action was observed after 16 hours' immersion in any of these solvents. Immersion in boiling water for 24 hours caused no swelling of the copolymer, nor did immersion for 24 hours in 70% $HNO_3$ at room temperature.

When the copolymer is subjected to low temperatures, it retains its elastomeric properties even at 0° C. and stiffens only slightly at —5° C.

Example 8

To a conditioned stainless steel polymerization vessel is added a solution of 1.04 parts of ammonium persulfate, 0.2 part of sodium bisulfite, 2.1 parts of disodiumhydrogen phosphate heptahydrate and 0.5 part of ammonium perfluorooctanoate in 160 parts of deoxygenated water. Then 200 parts of a mixture of 85% by weight hexafluoropropylene and 15% by weight vinylidene fluoride are introduced into the vessel. The mixture is heated with agitation to 100° C., the pressure falling from 900 p.s.i. to 550 p.s.i. in 45 minutes, at which point the reaction is complete. The latex produced in this manner is coagulated with sodium chloride and the coagulant washed and dried to yield 58 parts of polymer. Elemental analysis showed the composition of the polymer to be approximately 69% by weight hexafluoropropylene and 31% by weight vinylidene fluoride. It is a white, tough elastomeric material.

Example 9

The elastomer obtained in Example 8 is compounded on a rubber mill at about 40° C. to contain the following ingredients:

|  | Parts |
|---|---|
| Copolymer | 100 |
| Zinc oxide | 5 |
| "Hi-Sil" 202 silica (see Ex. 5) | 17.5 |
| LM–3 silicone oil [1] | 2.5 |

[1] LM–3 silicone oil is a low molecular weight silicone oil.

The compounded stock is press-molded at about 120° C. for 10 minutes. The specimen is then subjected to beta-radiation (a dose of about $7 \times 10^6$ rep.). It is then heated in an oven at 200° C. for between 12 and 24 hours to give an elastomer stable to storage and further heating.

Example 10

The elastomer of Example 8 is compounded on a rubber mill at about 40° C. to contain the following ingredients:

| | Parts |
|---|---|
| Copolymer | 100 |
| "Hi-Sil" 200 silica (see Ex. 5) | 17.5 |
| LM-3 silicone oil [1] | 2.5 |
| Zinc oxide | 5 |
| Dibasic lead phosphite | 5 |
| Triethylene tetramine | 1.0 |
| Sulfur | 1.0 |

[1] LM-3 silicone oil is a low molecular weight silicone oil.

The compounded stock is molded at 150° C. to 200° C. for from 60 to 120 minutes and then after-cured at 200° C. for from 12 to 24 hours. A tough, snappy elastomer is obtained having the thermal properties of that described in Example 5.

*Example 11*

Employing equipment such as illustrated in the accompanying drawing, hexafluoropropylene is passed at a rate of 2 pounds per hour and vinylidene fluoride at 3 pounds per hour into a one gallon stainless steel reactor 5, which is maintained at 100° C. and operated at 900 p.s.i. pressure. Simultaneously, an initiator-dispersant solution made up of:

135 parts of ammonium persulfate
27 parts of sodium bisulfite
284 parts of disodium hydrogen phosphate
30 parts of ammonium perfluorooctanoate
21,000 parts of deoxygenated water is pumped at a rate of 1.06 gallons per hour into the reaction vessel. The vessel is agitated continuously. The operating pressure of 900 p.s.i. is maintained by adjusting the back pressure on valve 9 to 900 p.s.i. with nitrogen from cylinder 8. A steady stream of latex is produced in receiver 10. The latex is coagulated by addition of sodium chloride, the isolated copolymer washed and dried. Analysis shows the polymer composition by weight to be 40% hexafluoropropylene and 60% vinylidene fluoride.

*Example 12*

Following the details of Example 11, and using the same initiator-dispersant solution, the following operating conditions are used:

| | |
|---|---|
| Hexafluoropropylene pounds per hour | 3 |
| Vinylidene fluoride do | 2 |
| Catalyst-emulsifier solution gallons per hour | 1.06 |
| Temperature ° C | 100 |
| Pressure p.s.i. | 900 |

The polymer is obtained at a conversion of over 95% and is isolated by coagulating latex with sodium chloride. Analysis shows composition to be 60% by weight hexafluoropropylene—40% by weight vinylidene fluoride.

*Example 13*

The elastomer obtained in Example 11 is compounded on a rubber mill at from 25° to 50° C. to contain the following ingredients:

| | Parts |
|---|---|
| Polymer | 100 |
| Zinc oxide | 5 |
| Silica | 17.5 |
| LM-3 silicone oil | 2.5 |
| Benzoyl peroxide | 2.0 |

The compounded polymer is pressed into slabs and cured at 300° F. for 45 minutes. The following mechanical properties illustrate the very desirable properties of the elastomer made by the continuous process:

| | |
|---|---|
| Yerzley resilience (25° C.) percent | 52 |
| Permanent set at break do | 10 |
| Tensile strength p.s.i | 2500 |
| Elongation at break percent | 600 |
| TR 10 [1] ° C | −18 |
| Brittle point ° C | −43 |

[1] TR-10 values are obtained according to ASTM designation D-1329-54T.

*Example 14*

The elastomer as obtained in Example 11 is compounded on a rubber mill at 25° to 50° C. to contain the following ingredients:

| | Parts |
|---|---|
| Polymer | 100 |
| Zinc oxide | 10 |
| Dibasic lead phosphite | 10 |
| "Hi-Sil" 202 silica | 16 |
| LM-3 silicone oil | 4 |
| Hexamethylenediamine carbamate | 2 |

The compounded polymer is press-cured for 30 minutes at 275° F. and then oven cured as follows:

| | °F. |
|---|---|
| 1 hour | 212 |
| 1 hour | 250 |
| 1 hour | 300 |
| 1 hour | 350 |
| 24 hours | 400 |

The cured polymer has the following properties:

| | Initial | Percent Retention of Properties after aging at 450° F. | |
|---|---|---|---|
| | | After 14 days | After 28 days |
| Modulus—100% elongation, p.s.i | 875 | 72 | 100 |
| Tensile at break, p.s.i | 2,200 | 91 | 75 |
| Elongation at break, percent | 425 | 83 | 50 |
| Shore Hardness (A) | 76 | Point change +9 | Point change +8 |

The same polymer, when aged at 550° F. for as long as 72 hours, has substantially the same elastic properties.

When MT carbon black is substituted in the above example for the silica and silicone oil combination, substantially the same good elastomeric properties are obtained. As pointed out above, other curing agents may of course be substituted for that specifically used in the examples.

The elastomers of the present invention may be compounded in the usual manner employed in the compounding of elastomers generally, where additives are generally incorporated on the standard rubber processing equipment. Fillers, softening agents, reenforcing agents such as furnace blacks, and silicas of various types including "Estersils" (esterified silica) may be incorporated therein.

I claim:
1. An elastic copolymer of about 70% to 30% by weight of vinylidene fluoride and from about 30% to 70% by weight of hexafluoropropene.

2. An elastic copolymer consisting of 60% by weight of vinylidene fluoride and 40% by weight of hexafluoropropene.

3. A process for preparing an elastic polymer which comprises reacting from 60 to 15 parts by weight of vinylidene fluoride with from 40 to 85 parts by weight of hexafluoropropene at temperatures of from 80° to 120° C. under autogenous pressure and in the presence of a polymerization initiator.

4. A process for preparing an elastic polymer which comprises reacting from 60 to 15 parts by weight of vinylidene fluoride with from 40 to 85 parts by weight of hexafluoropropene at temperatures of from 80° to 120° C. under autogenous pressure and in the presence of a salt of a true non-metallic peracid as a polymerization initiator.

5. A continuous process for preparing an elastic copolymer of vinylidenefluoride and hexafluoropropene, which comprises feeding the monomers at a constant ratio between 70:30 and 30:70 by weight into a constant volume of aqueous initiator dispersant solution while maintaining a constant temperature of the solution at from 80° to 120° C. and a constant pressure of from 250 to 1500 pounds per square inch gauge, while maintaining a constant ratio of the initiator present in the solution to the total monomers fed.

6. A novel amorphous elastomeric copolymer consisting essentially of hexafluoropropene and vinylidenefluoride in copolymerized form and in which the hexafluoropropene is present in an amount between about 15 and about 49 mol percent.

7. A novel amorphous elastomeric copolymer consisting essentially of hexafluoropropene and vinylidenefluoride in copolymerized form and in which the hexafluoropropene is present in amount between about 15 and about 30 mol percent.

8. A novel amorphous elastomeric copolymer consisting essentially of hexafluoropropene and vinylidenefluoride in copolymerized form and in which the hexafluoropropene is present in an amount of about 15 mol percent.

9. A novel amorphous elastomeric copolymer consisting essentially of hexafluoropropene and vinylidenefluoride in copolymerized form and in which the hexafluoropropene is present in an amount of about 30 mol percent.

10. A process which comprises copolymerizing a monomer feed mixture consisting essentially of hexafluoropropene and vinylidenefluoride in which the hexafluoropropene is present in the monomer feed mixture in an amount between about 23 and about 39 mol percent at a temperature of between about 80° C. and about 120° C. in the presence of a free radical-forming polymerization promoter to produce a copolymer consisting essentially of hexafluoropropene and vinylidenefluoride.

11. An aqueous latex of a copolymer of claim 1.

References Cited in the file of this patent

UNITED STATES PATENTS

| | | |
|---|---|---|
| 2,547,815 | Leendert | Apr. 5, 1951 |
| 2,549,935 | Sauer | Apr. 24, 1951 |
| 2,689,241 | Dittman | Sept. 14, 1954 |
| 2,705,706 | Dittman et al. | Apr. 5, 1955 |